United States Patent [19]

Imamura et al.

[11] Patent Number: 5,112,147
[45] Date of Patent: May 12, 1992

[54] ROTATING SUPPORT APPARATUS IN DISK STORAGE DEVICE

[75] Inventors: Takahiro Imamura, Fujisawa; Yoshifumi Mizoshita, Tama; Keiji Aruga, Hiratsuka, all of Japan

[73] Assignee: Fujitsu Limited, Kawasaki, Japan

[21] Appl. No.: 650,271

[22] Filed: Feb. 4, 1991

[30] Foreign Application Priority Data

Feb. 5, 1990 [JP] Japan .................................. 2-24406

[51] Int. Cl.[5] ............................................ F16C 19/52
[52] U.S. Cl. .................................... 384/605; 384/493
[58] Field of Search ............... 384/605, 617, 493, 557, 384/905, 569

[56] References Cited

U.S. PATENT DOCUMENTS 4,226,485 10/1980 Pruvot .
4,814,652 3/1989 Wright .
4,829,657 5/1989 Wright .
4,928,029 5/1990 Wright .

FOREIGN PATENT DOCUMENTS 62-71064 4/1987 Japan .
63-129256 8/1988 Japan .
1-290164 11/1989 Japan .

Primary Examiner—Lenard A. Footland
Attorney, Agent, or Firm—Armstrong, Nikaido, Marmelstein, Kubovcik & Murray

[57] ABSTRACT

A rotating support apparatus in a disk storage device is provided with a stationary shaft, ball bearings rotatably fitted on the stationary shaft, a rotatable member rotatably supported by and on the ball bearings, and buffer rings superimposed between the associated ball bearings and the rotatable member to absorb a thermal deformation of the rotatable member due to a change in a temperature. The buffer rings have a same coefficient of linear expansion as that of the material of which the rotatable member is made, and each of the buffer rings is in contact, at two points of the outer inner surfaces thereof, with the rotatable member or outer races of the ball bearings, and at one point of the inner or outer surface thereof, with the associated ball bearing or the inner surface of the hub, respectively.

17 Claims, 7 Drawing Sheets (PRESENT INVENTION)

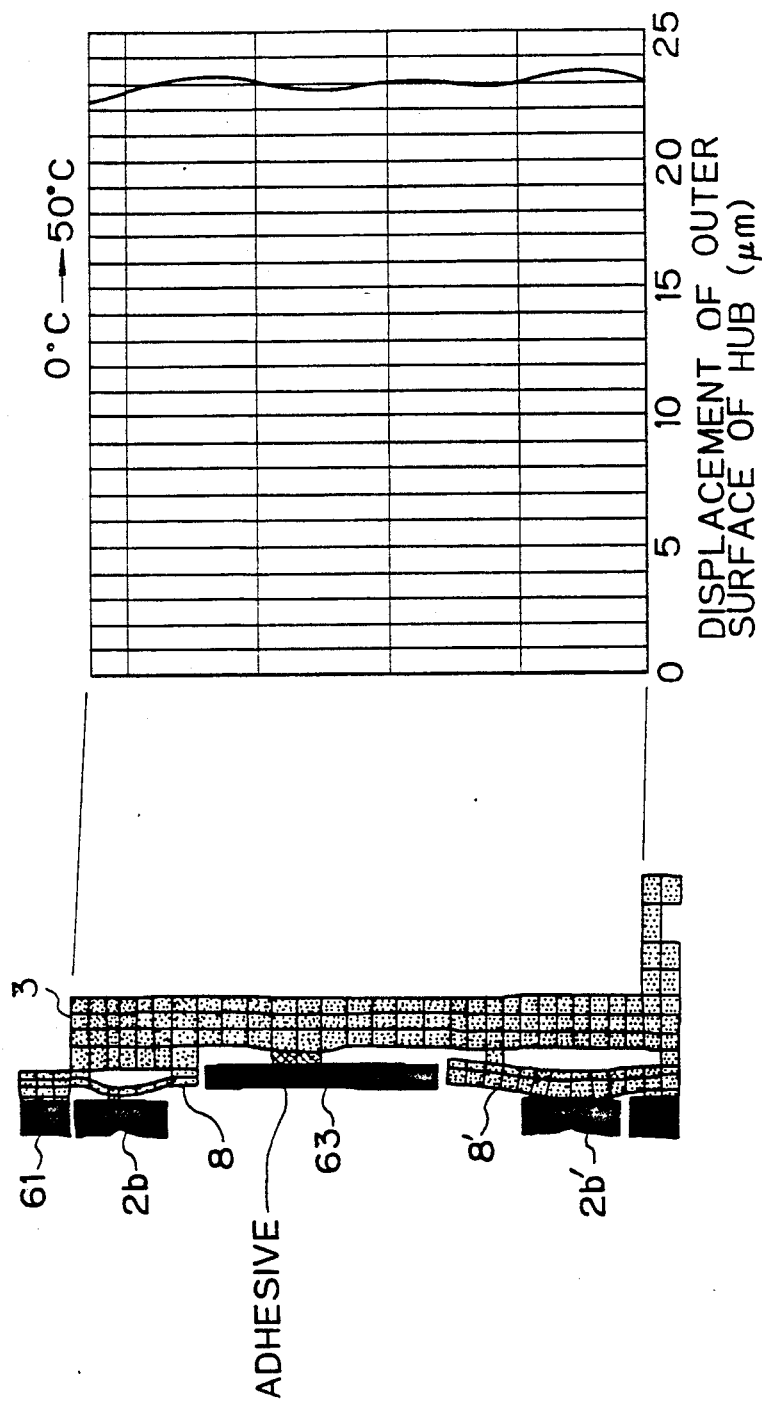
Fig. 3B (PRESENT INVENTION)

ROTATING SUPPORT APPARATUS IN DISK STORAGE DEVICE

BACKGROUND OF THE INVENTION

1. Field of the Invention

The present invention generally relates to a rotating support apparatus in a disk storage device, such as a magnetic disk device or an optical disk device, and more particularly, relates to a spindle assembly or a magnetic head positioner, in a disk file apparatus used as an external storage device of a computer.

2. Description of the Related Art

FIG. 6 shows a conventional spindle assembly in a disk file apparatus, in which shaft 1 is secured at opposite ends thereof to a disk housing (not shown) and is fitted with a pair of ball bearings 2 and 2', which are spaced from one another at a predetermined distance along the axis of the shaft 1. The outer races 2b of the ball bearings 2 and 2' are fitted in a hub 3, which supports a plurality of superimposed magnetic disks 4. An internal space 5 of the spindle hub 3 is provided with a larger diameter, to enable a motor (not shown) to be accommodated therein to drive (rotate) the magnetic disks 5. The lower bearing 2' is fitted in the internal space 5 though a ring (spacer) 6 having a uniform outer diameter.

In a known spindle arrangement as shown in FIG. 6, the upper ball bearing 2 (which is usually made of iron or the like) is directly fitted in the inner surface of the hub 3 (which is usually made of aluminium or the like), and the lower ball bearing 2' is fitted in the inner surface of the hub 3 through the ring 6 (which is usually made of steel, aluminium or the like), as mentioned above, and since there is a difference in the coefficients of linear expansion of the materials of the ball bearing 2 (iron) and the hub 3 (aluminium), and of the ring 6 (iron) and the hub 3 (aluminium), ① a thermal off-tracking and ② a thermal decentering of the rotating apparatus, including the magnetic disks 4, may occur due to changes in the temperature. Namely, in the thermal off-tracking, a thermal deformation on the order of microns takes place at the outer peripheral surface of the hub and the magnetic disk supporting surfaces of the hub 3, resulting in a thermal deformation of the superimposed magnetic disks into an umbrella shape or a deviation thereof. In the thermal decentering of the rotating apparatus, the center of rotation of the rotating apparatus is deviated due to a gap produced between the hub 3 and the ball bearing 2 or the ring 6, which results in a failure to precisely and correctly read and write signal information from and to the magnetic disks 4.

SUMMARY OF THE INVENTION

The primary object of the present invention is to provide a spindle assembly in a disk storage apparatus in which neither the thermal off tracking nor the thermal decentering of a disk medium, such as a magnetic disk, occur.

To achieve the object mentioned above, according to the present invention, there is provided a rotating support apparatus in a disk storage device, comprising a stationary shaft, ball bearings rotatably fitted to the stationary shaft, a rotatable member rotatably supported by and on the ball bearings, and buffer rings superimposed between the associated ball bearings and the rotatable member to absorb possible thermal deformation of the rotatable member due to changes in the temperature, the buffer rings having a same coefficient of linear expansion as that of the material of which the rotatable member is made, each of the buffer rings being in contact, at three points of the outer and inner surfaces thereof in total, with the rotatable member and the associated ball bearing.

With this arrangement, each of the buffer rings comes into contact, at the two points of the upper and lower outer or inner peripheral surface portions thereof, with the hub 3 or the outer races of the ball bearings, and at one point of the inner or outer peripheral surface portion, with the outer races of the ball bearings or the inner surface of the hub, respectively. The portions of the buffer rings between the contacting points are made thinner, and accordingly, a dimensional difference occurring between the outer races of the ball bearings and the hub due to differences in the thermal expansion thereof can be absorbed by a deformation of the thin portions of the buffer rings, and no deformation of the hub will occur.

Note that the term "point" referred to in the present invention means a portion having a certain surface area, and accordingly, the "contacting point" means a "surface" or "line" contact and not a "point" contact.

BRIEF DESCRIPTION OF THE DRAWINGS

The invention will be described below in detail with reference to the accompanying drawings, in which:

FIGS. 3A and 3B are diagrams of the results of a simulation test, showing the deformation of a ball bearing, a hub and a buffer ring (FIG. 3B only) according to the prior art (FIG. 3A) and the present invention (FIG. 3B);

DESCRIPTION OF THE PREFERRED EMBODIMENTS

Figure 1:
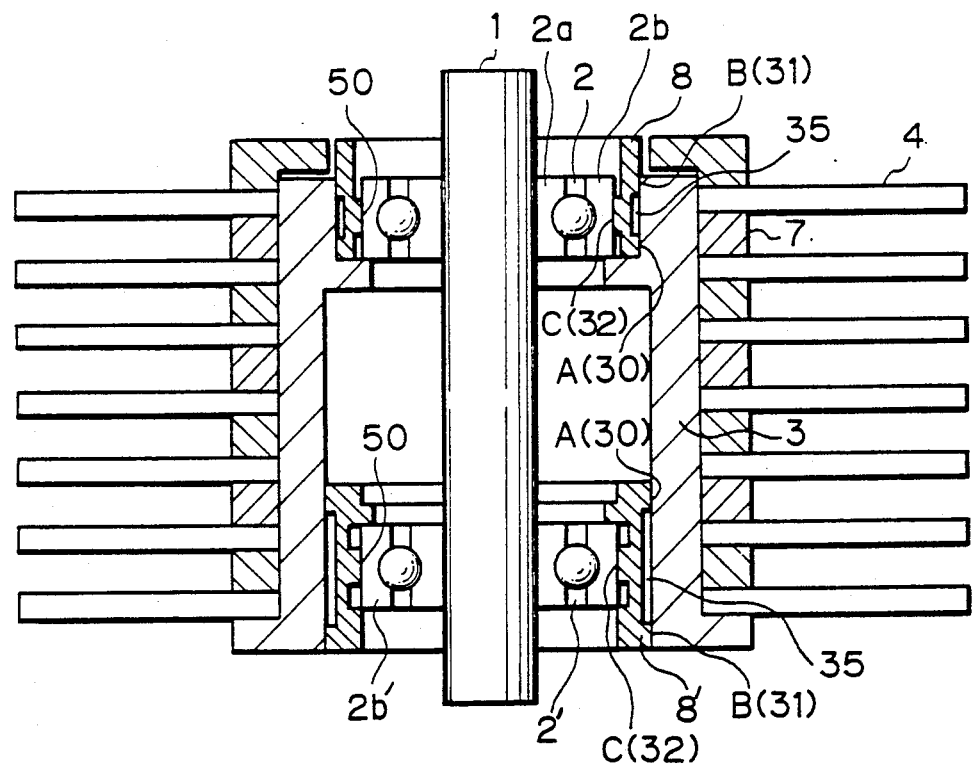
FIG. 1 is a sectional view of a spindle assembly according to an aspect of the present invention.

In FIG. 1, which shows a first embodiment of the present invention, a stationary shaft 1 is secured at opposite ends thereof to a disk housing (not shown) and is fitted with a pair of ball bearings 2 and 2' which are spaced from one another at a predetermined distance along the axis of the shaft 1. The ball bearings 2 and 2' are fitted in a substantially cylindrical hub 3, through buffer rings 8 and 8'. Namely, the outer races 2b and 2b' of the ball bearings 2 and 2' are fitted in the associated buffer rings 8 and 8'. The hub 3 supports a plurality of magnetic disks 4 and annular spacers 7, which are alternately superimposed one on the other. The buffer rings 8 and 8' are made of a same material as that of the hub 3. Namely, in the illustrated embodiment, both the buffer rings 8, 8' and the hub 3 are made of aluminium or an aluminium alloy. Each of the buffer rings 8 and 8' is brought into contact with the inner peripheral surface of the hub 3 only at two "points" A and B of the outer peripheral surface of the associated buffer ring 8 or 8', and the centers of the associated ball bearings 2 and 2' in the direction of the axis of the shaft 1 are located between the two points A and B of the associated buffer rings 8 and 8'. The fit between the ball bearings 2 and 2' and the associated buffer rings 8 and 8' is preferably an interference fit, but is not limited thereto. Namely, there is no restriction to the manner of the fitting between the ball bearings 2 and 2' and the associated buffer rings 8 and 8'.

As shown in the Figure, the buffer rings 8 and 8' each come into contact with the outer races 2b and 2b' of the ball bearings 2 and 2' only at one "point" C of the inner peripheral surface of the associated buffer ring 8 (8'). These contacting points C of the buffer rings 8 and 8' are located at the centers of the associated ball bearings 2 and 2' in the direction of the axis of the shaft 1, or are in the vicinity thereof.

Note that the term "point (A, B or C)" as defined in the specification of the present invention means a portion having a certain area, and accordingly, means a surface contact, as mentioned above. Namely, the term, "point (A, B or C)" is used to clarify the number of portions at which the buffer rings are in contact with the hub and the respective ball bearings. The fit between the buffer rings 8, 8' and the associated ball bearings 2, 2' at the points C is preferably an interference fit, with or without the aid of an adhesive 50 (FIG. 1).

The points A, B, and C of the buffer rings 8, 8' are defined by peripheral projections 30, 31, and 32, respectively. The buffer rings 8 and 8' are provided on the outer surfaces thereof with peripheral grooves 35 between the projections 30 and 31, and the projections 32 (points C) of the buffer rings 8 and 8' are located to be opposed to the grooves 35. Consequently, the buffer rings 8 and 8' are thinner at the portions between the points A and C and between the points B and C.

The operation of the spindle assembly of the present invention as constructed above is as follows.

If it is assumed that there is no distortion of the components of a spindle assembly in which the ball bearings 2 and 2' are fitted in the hub 3 through the buffer rings 8 and 8', at 50° C., then if the temperature drops to 0° C., the contraction of the hub 3 is larger than that of the outer races 2b and 2b' of the ball bearings 2 and 2', which are in contact with the inner surface of the hub 3 through the buffer rings 8 and 8', since the iron of which the ball bearings 2 and 2' are made has a smaller coefficient of thermal expansion than that of the aluminium of which the hub 3 and the buffer rings 8 and 8' are made.

This difference in contraction, however, can be absorbed by a deformation of the thinner portions of the buffer rings 8 and 8' located between the points A and C and between C and B, and as a result, a minimum deformation of the hub 3 and the outer races 2b and 2b' of the ball bearings 2 and 2' occurs. An asymmetric deformation of the outer races 2b and 2b' of the ball bearings 2 and 2' is also avoided, since the outer races are in contact with the buffer rings 8 and 8' only at the center portions (C) of the outer races of the ball bearings and are supported symmetrically with respect to the centers thereof in the axial direction respectively, thus resulting in a maintaining of a high rotational precision.

Conversely, if the temperature becomes higher, the buffer rings 8 and 8' absorb the subsequent heat distortion, and accordingly, a gap which would be otherwise produced between the hub 3 and the outer races of the ball bearings 2 and 2' as a result of the loss of the interference fit therebetween, does not appear, and thus the resulting thermal decentering occurring in the prior art is prevented by the present invention.

Figure 6:
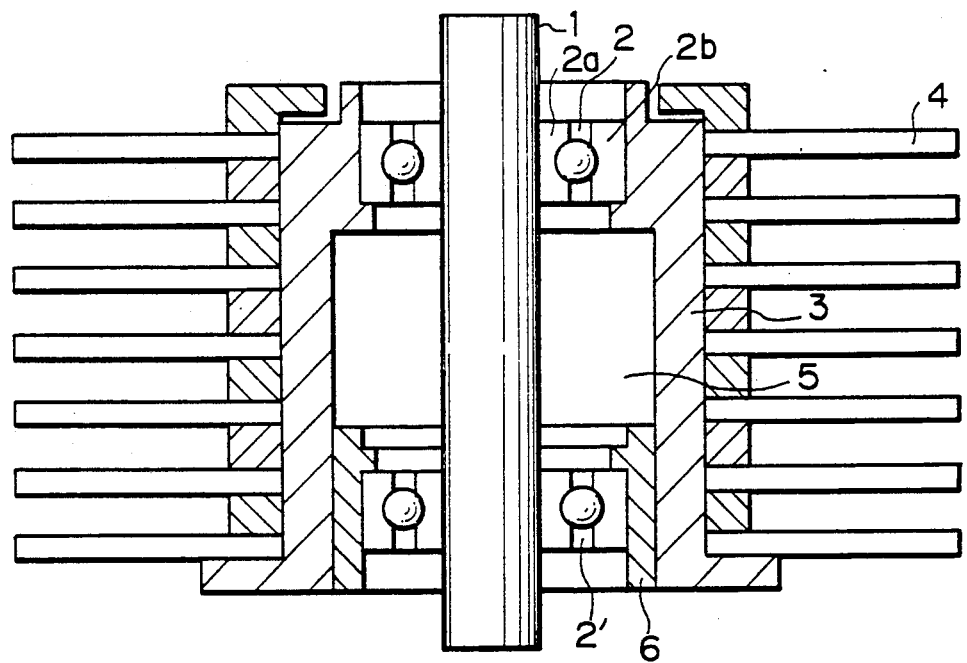

As stated previously, where the iron ring (spacer) 6 is interposed between the hub 3 and the outer race 2b of the ball bearing 2 in the prior art, as shown in FIG. 6, the same gap appears between the iron ring 6 and the hub 3.

In the illustrated embodiment, although the thinner portions of the buffer rings 8 and 8' are slightly weakened, nevertheless the rigidity of the thinner portions is much larger than the radial rigidity of the ball bearings, and is strong enough to resist any oscillation.

Figure 2A:
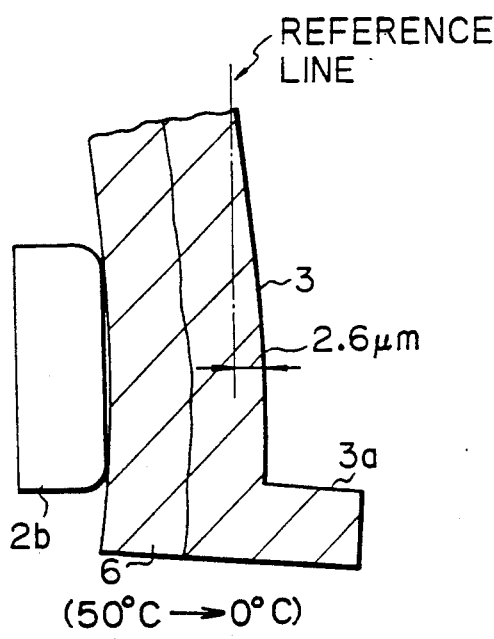
FIGS. 2A and 2B are explanatory views of a ball bearing, a hub and a buffer ring (FIG. 2B only), showing the results of a simulation test when the temperature was varied.
Figure 2B:
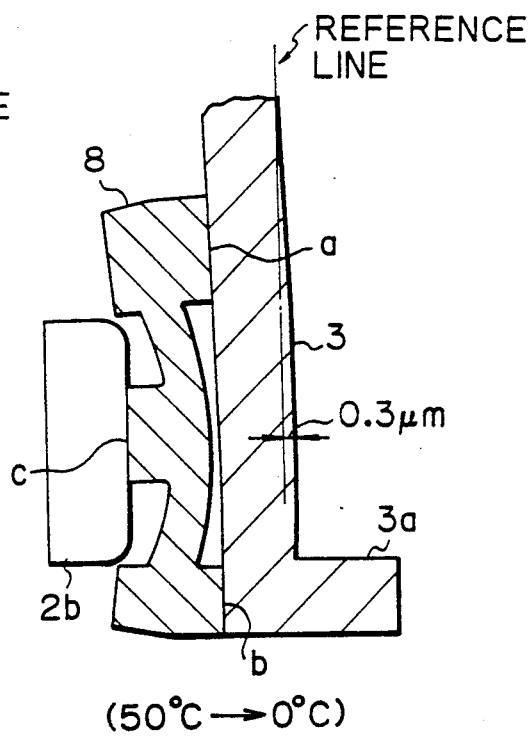

FIGS. 2A and 2B show the results of simulation test of deformation caused by a change in the temperature of from 50° C. to 0° C. As can be seen from FIGS. 2A and 2B, a deformation of about 2.6 $\mu$m of the outer surface portion of the hub 3 corresponding to the contacting portions thereof with the outer race 2b of the ball bearing occurs in the prior art shown in FIG. 2A, whereas in our invention, the deformation is reduced to about 0.3 $\mu$m, as shown in FIG. 2B.

Furthermore, little or no deformation of the disk support surface portion 3a of the hub 3 occurs in this invention (FIG. 2B), in comparison with the prior art (FIG. 2A) in which the disk support surface 3a is deformed to be slightly inclined.

Figure 3A:
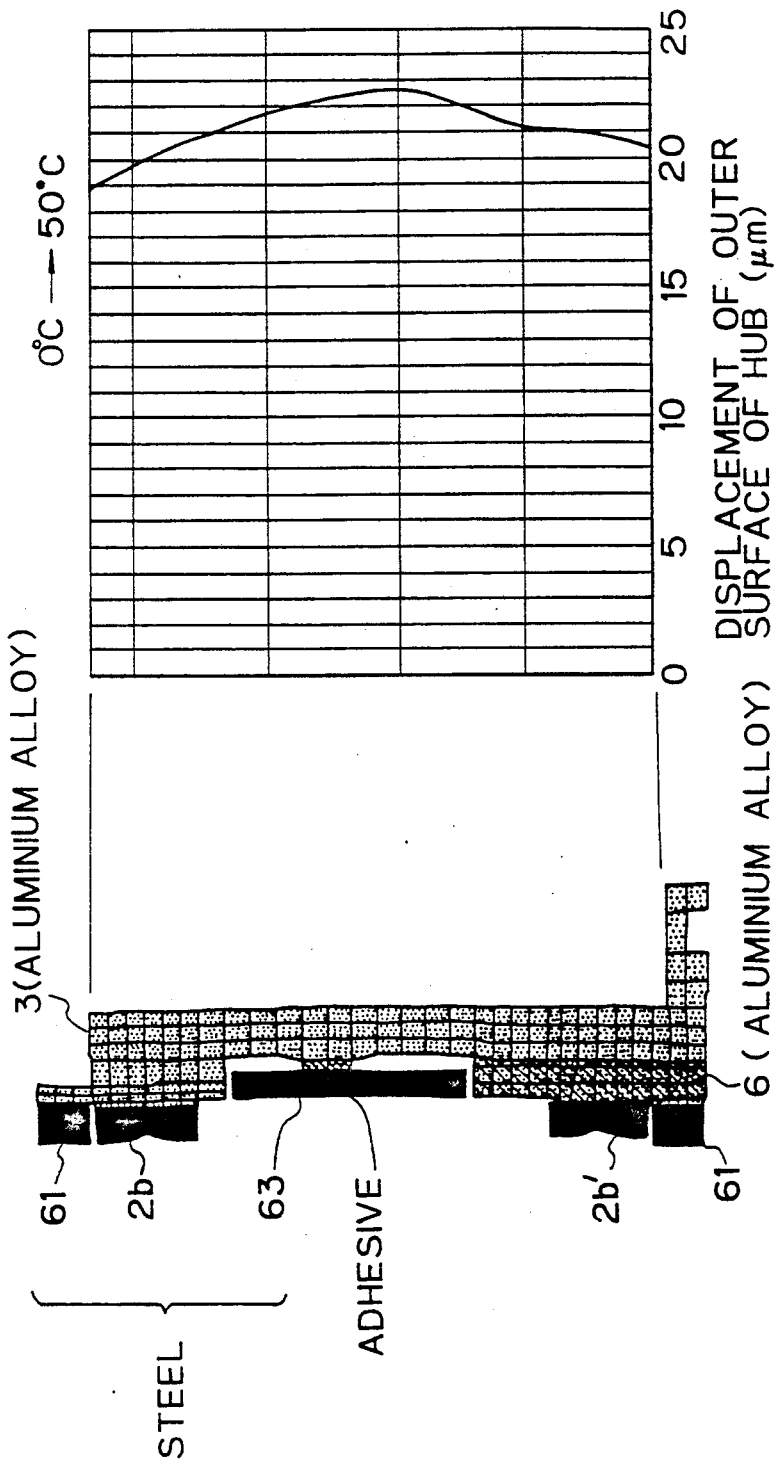

FIG. 3A and 3B show in more detail the results of a simulation test of a comparison of the present invention (FIG. 3B) with the prior art (FIG. 3A), to show that the deformation of the outer surface of the hub 3 due to a change in temperature is much smaller in the present invention than in the prior art. In the study (simulation), the temperature was increased from 0° C. to 50° C.

In FIGS. 3A and 3B, numerals 61 and 63 designate a magnetic sealing sleeve and a rotor of a motor housed in the internal space of the hub 3, for rotating the hub 3, respectively.

The simulation (study) shown in FIGS. 2A and 2B was directed only to the portion of the hub in the vicinity of the lower ball bearing, whereas the simulation (study) shown in FIGS. 3A and 3B was addressed to the whole hub. This is the reason why there is a slight difference in deformation of the hub between the result of FIGS. 22A and 2B and the result of FIG. 3A and 3B.

Note, that the temperature was increased from 0° C. to 50° C. in FIGS. 3A and 3B, whereas it dropped from 50° C. to 0° C. in FIGS. 2A and 2B, as mentioned above. Accordingly, the direction of deformation of the hub in FIGS. 2A and 2B should be opposite to that in FIGS. 3A and 3B, but the directions of the deformation of the hub are shown to be identical to each other in both the simulation results only for clarification.

Although the above-mentioned embodiment is applied to a spindle assembly in a disk file apparatus, the present invention can be generically applied to a rotating support device in any disk storage device.

Figure 4:
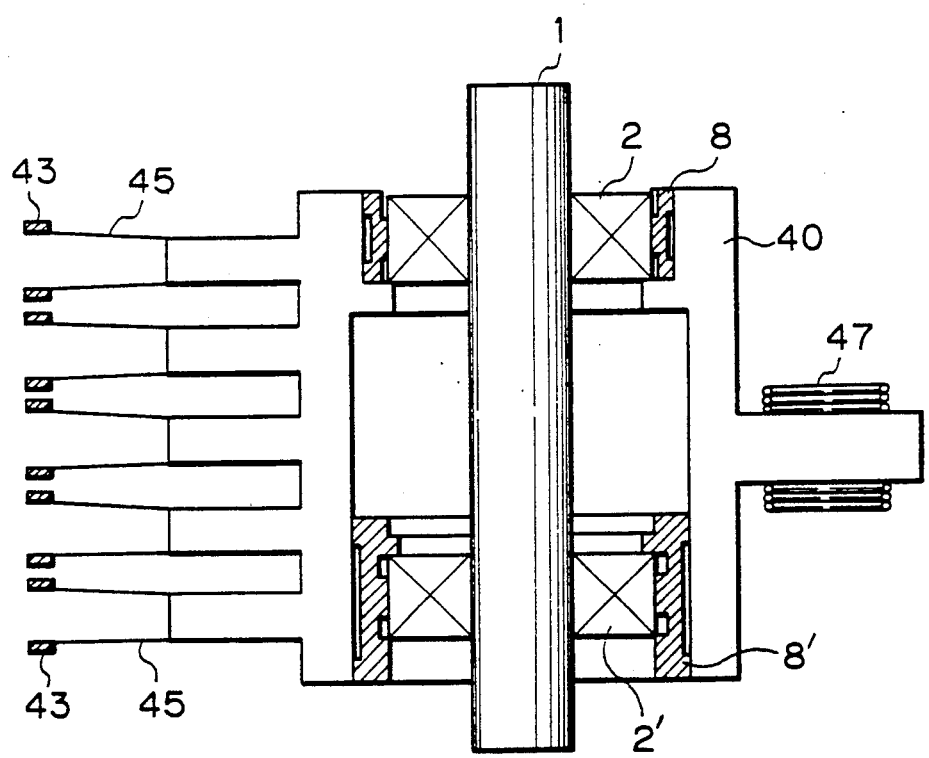
FIG. 4 is a view similar to FIG. 1, according to another aspect of the present invention.

FIG. 4 shows another embodiment of the present invention, which is applied to a positioner of a magnetic head in a magnetic recording and/or reading device. In FIG. 4, the buffer rings 8 and 8' are interposed between the ball bearings 2, 2' and a substantially cylindrical carriage 40 which supports magnetic heads 43 through respective support springs 45 and a voice coil 47. The principle of the interposition of the buffer rings between the bearings and the rotatable member (e.g., the hub 3 in FIG. 1 or the carriage 40 in FIG. 4) can be applied to the arrangement shown in FIG. 4.

Figure 5A:
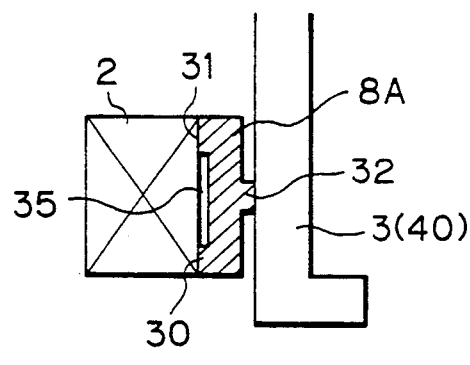
FIG. 5A and 5B are partial views of a hub, a buffer ring and a ball bearing, according to two different embodiments of the present invention; and, FIG. 6 is a sectional view of a known spindle assembly.
Figure 5B:
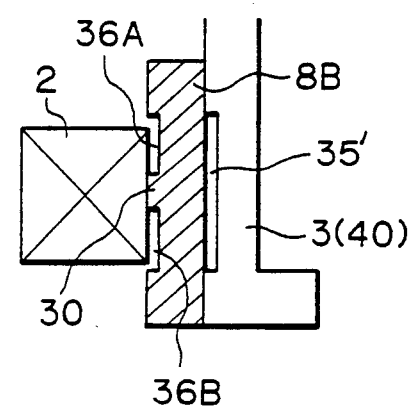

FIGS. 5A and 5B show two modified embodiments of the present invention.

In FIG. 5A, each of the buffer rings (only 8A is shown) comes into contact with the outer race 2b of the associated ball bearing 2 and the inner surface of the rotating member (hub 3 or carriage 40) at two "points" and one "point", respectively. Namely, the buffer ring 8A is provided, on its inner peripheral surface, with two peripheral projections 30 and 31, and on the outer peripheral surface thereof, with one peripheral projection 32. The buffer ring 8A is also provided with a peripheral groove 35 in the inner surface thereof to thereby form a deformable thinner portion. Note, the arrangement of the two contacting points and one contacting point between the buffer ring and the ball bearing and between the buffer ring and the rotating member is the opposite to that shown in FIG. 1.

In FIG. 5B, the buffer ring 8B has a peripheral projection 32 only on the inner surface thereof, and thus the buffer ring 8B is in contact with the outer race 2b of the associated ball bearing 2 only at one "point". The outer ring 8B is also provided in the inner peripheral surface thereof with peripheral grooves 36A and 36B located on opposite sides of the projection 30. The buffer ring 8B has a uniform outer diameter, unlike the buffer ring 8 (FIG. 1) or 8A (FIG. 5A). To provide the two-"point" contact between the buffer ring 8B and the rotating member 3 (or 40), a peripheral groove 35' corresponding to the peripheral groove 35 of the buffer ring 8 in FIG. 1 is provided on the inner peripheral surface of the rotating member 3 (40) and not in the buffer ring 8B.

It will be easily understood that the operation of the modified embodiments illustrated in FIGS. 5A and 5B is similar to that of the embodiment shown in FIG. 1, and has the same technical effects as mentioned above.

As can be understood from the foregoing, according to the present invention, the buffer rings are inserted between ball bearings and a rotatable member rotatably supported by the ball bearings, to prevent a deformation of the rotatable member within a wide temperature range, so that neither a thermal off tracking nor a thermal decentering of the disk medium take place, thus resulting in an increased reliability of the disk storage apparatus.

The buffer rings 8 and 8' can have either an identical or a different shape from one another.

Each buffer ring 8 or 8' (8A or 8B) is preferably symmetrical with respect to the center line in the axial direction thereof.

We claim:

1. A rotating support apparatus in a disk storage device, comprising a stationary shaft, ball bearings rotatably fitted on the stationary shaft, a rotatable member rotatably supported by and on the ball bearings, and buffer rings superimposed between the associated ball bearings and the rotatable member to absorb a thermal deformation of the rotatable member due to a change in a temperature, said buffer rings having a same coefficient of linear expansion as that of the material of which the rotatable member is made, each of said buffer rings being in contact, at three points of the outer and inner surfaces thereof in total, with the rotatable member and the associated ball bearing.

2. A rotating support apparatus according to claim 1, wherein each of said ball bearings has an inner race and an outer race and is rotatably fitted on the stationary shaft through the inner race, so that said buffer rings are superimposed between the outer races of the associated ball bearings and an inner surface of the rotatable member.

3. A rotating support apparatus according to claim 2, wherein each of said buffer rings is in contact, at two points of the outer surface thereof, with the rotatable member and at one point of the inner surface thereof, with the outer race of the associated ball bearings, respectively.

4. A rotating support apparatus according to claim 3, wherein each of said buffer rings has two peripheral projections on the outer surface thereof defining the two contacting points with the rotatable member and a peripheral groove provided between the peripheral projections to thereby form a deformable thinner portion.

5. A rotating support apparatus according to claim 3, wherein each of said buffer rings has one peripheral projection on the inner surface thereof defining one contacting point with the outer race of the associated ball bearing.

6. A rotating support apparatus according to claim 5, wherein said peripheral projections in the inner surfaces of the buffer rings are located to be opposed to the peripheral grooves of the outer surfaces of the buffer rings.

7. A rotating support apparatus according to claim 6, wherein said peripheral projections on the inner surfaces of the buffer rings are in contact with the outer races of the associated ball bearings at the center portions thereof in an axial direction of the ball bearings or in the vicinity thereof.

8. A rotating support apparatus according to claim 3, wherein said buffer rings and the rotatable member are made of aluminium.

9. A rotating support apparatus according to claim 2, wherein said buffer rings are fitted on the outer races of the associated ball bearings with an interference fit.

10. A rotating support apparatus according to claim 9, wherein said buffer rings are fitted on the outer races of the associated ball bearings with an interference fit and the aid of an adhesive.

11. A rotational supporting apparatus according to claim 2, wherein said buffer rings and the ratatabale member are made of an aluminium alloy.

12. A rotating support apparatus according to claim 2, wherein said ball bearings are made of steel or the like.

13. A rotating support apparatus according to claim 2, wherein each of said buffer rings is in contact, at two points of the inner surface thereof, with the outer race of the associated ball bearing and at one point of the outer surface thereof, with the rotatable member, respectively.

14. A rotating support apparatus according to claim 13, wherein each of said buffer rings has two peripheral projections on the inner surface thereof defining the two contacting points with the outer race of the ball bearing and a peripheral groove provided between the peripheral projections to thereby form a beformable thinner portion.

15. A rotating support apparatus according to claim 14, wherein each of said buffer rings has one peripheral projection on the outer surface thereof defining one contacting point with the rotatable member.

16. A rotating support apparatus according to claim 2, wherein each of said buffer rings is provided on its inner peripheral surface with a peripheral projection and divided peripheral grooves on the opposite sides of the peripheral projection.

17. A rotating support apparatus according to claim 16, wherein said roatatable member is provided on its inner surface with peripheral grooves opposed to the peripheral projections in the inner surfaces of the associated buffer rings.

* * * * *